(12) United States Patent
Chaudhary et al.

(10) Patent No.: US 11,457,153 B2
(45) Date of Patent: Sep. 27, 2022

(54) ACTIVE AUDIO-VISUAL SURVEILLANCE SYSTEM

(71) Applicant: NCS PTE. LTD., Singapore (SG)

(72) Inventors: Nitesh Kumar Chaudhary, Singapore (SG); Sunil Sivadas, Singapore (SG)

(73) Assignee: NCS PTE, LTD., Singapore (SG)

( * ) Notice: Subject to any disclaimer, the term of this patent is extended or adjusted under 35 U.S.C. 154(b) by 0 days.

(21) Appl. No.: 17/349,025

(22) Filed: Jun. 16, 2021

(65) Prior Publication Data

US 2021/0392271 A1    Dec. 16, 2021

(51) Int. Cl.
*H04N 5/232*    (2006.01)
*H04N 7/18*     (2006.01)

(52) U.S. Cl.
CPC ..... *H04N 5/23299* (2018.08); *H04N 5/23238* (2013.01); *H04N 7/18* (2013.01)

(58) Field of Classification Search
CPC ............ H04N 5/23299; H04N 5/23238
See application file for complete search history.

(56) References Cited

U.S. PATENT DOCUMENTS

| | | | | |
|---|---|---|---|---|
| 11,196,944 B2* | 12/2021 | Zavesky | .............. | G06T 5/50 |
| 11,205,247 B2* | 12/2021 | Choi | ................... | G06N 3/08 |
| 2007/0263093 A1* | 11/2007 | Acree | ................... | H04N 7/181 |
| | | | | 348/E7.086 |
| 2016/0027290 A1* | 1/2016 | English | ................. | H04N 7/181 |
| | | | | 340/539.13 |
| 2017/0070668 A1* | 3/2017 | Bohac | .................... | G06V 10/17 |
| 2019/0208168 A1* | 7/2019 | Collings, III | .......... | H04N 7/188 |
| 2021/0097646 A1* | 4/2021 | Choi | ..................... | G06N 20/20 |
| 2021/0118104 A1* | 4/2021 | Kornienko | ............ | G06T 3/0018 |
| 2021/0352222 A1* | 11/2021 | Zavesky | .................. | G06T 5/50 |

* cited by examiner

*Primary Examiner* — Boubacar Abdou Tchoussou
(74) *Attorney, Agent, or Firm* — Mark H. Whittenberger; Holland & Knight LLP

(57) ABSTRACT

An active audio-visual system and method for identifying events occurring at a location-of-interest is provided. In particular, a system that comprises a Fisheye image capturing device, an audio module and a computing module communicatively coupled to both the image capturing device and the audio module whereby all the modules and devices are provided at the location-of-interest is provided. In operation, the audio module is configured to issue a notification to the computing module when an audio event is detected at the location-of-interest. The notification, which will contain a point of origin of the audio event, will then be used by the computing module to cause the calibrated Fisheye image capturing device to provide a captured high-resolution perspective image of the point of origin of the audio signal to an event identification module for further processing.

10 Claims, 5 Drawing Sheets

ACTIVE AUDIO-VISUAL SURVEILLANCE SYSTEM

RELATED APPLICATION(S)

This application claims the benefit of Singapore Patent Application No. 10202005685Y, filed on Jun. 16, 2020. The entire contents of which is herein incorporated by reference.

FIELD OF THE INVENTION

This invention relates to an active audio-visual system and method for identifying events occurring at a location-of-interest. In particular, the invention relates to a system that comprises a Fisheye image capturing device, an audio module and a computing module communicatively coupled to both the image capturing device and the audio module whereby all the modules and devices are provided at the location-of-interest. In operation, the audio module is configured to issue a notification to the computing module when an audio event is detected at the location-of-interest. The notification, which will contain data relating to the a Direction of Arrival (DOA) of the audio signal, will then be used by the computing module to cause the calibrated Fisheye image capturing device to generate high-resolution perspective images based on the non-distorted perspective images associated with the DOA of the audio signal.

Summary of Prior Art

Existing surveillance systems typically involve the use of surveillance devices (such as closed-circuit security video systems) to monitor activities at locations-of-interest to deter, prevent and/or detect suspicious activities or abnormal events that may occur. The most commonly used image capturing device in such systems would be either a fixed camera or a mobile camera that may be remotely controlled. A Pan-Tilt-Zoom (PTZ) camera equipped with, pan, tilt, and Zoom functions is widely used as such a mobile camera. In particular, the pan function comprises the function of moving the image capturing direction of the PTZ camera along a horizontal direction, the tilt function comprises the function of moving the image capturing direction of the PTZ camera along a vertical direction and the Zoom function comprises the function of enlarging or reducing the size of an image captured by the PTZ camera.

Hence, such PTZ cameras are now widely used to monitor open areas such as airports, shopping malls, parking lots, retail mall, housing areas; or closed areas such as elevators, buses, kiosks and etc. as the PTZ camera may be controlled to capture images of specific areas within the location of interest.

The downside of such PTZ cameras is that specific instructions have to be provided to the PTZ cameras in order for such cameras to work properly else, such PTZ cameras will still function as a static camera as PTZ cameras are normally not provided with automatic triggering capabilities. In other words, someone will still have to be tasked to manually control the panning/zooming of the PTZ camera in order for the PTZ camera to cover the entire location of interest.

In order to introduce an automatic triggering function to such PTZ cameras, those skilled in the art have proposed that an acoustic tracking system that is configured to determine the location of a sound producing acoustic source from at least two defined locations be configured to control the functions of the PTZ cameras. The downside of this approach is that there is typically a delay in the detection and the response of the PTZ cameras and as a result, the incident that caused the sound may have left the area covered by the PTZ cameras by then.

For the above reasons, those skilled in the art are constantly striving to come up with a system and method that is able to actively and automatically capture images of events occurring within a location of interest in a prompt and efficient manner. This allows the event to be reported to a relevant party promptly and for a high resolution image of the event to be captured and transmitted to the relevant party as well.

SUMMARY OF THE INVENTION

The above and other problems are solved and an advance in the art is made by systems and methods provided by embodiments in accordance with the invention.

A first advantage of embodiments of systems and methods in accordance with the invention is that the invention is able to cover a large area within the location of interest as compared to conventional closed circuit cameras and as such, would be able to quickly capture an image of the incident that occurred in the location of interest before the cause of the incident has disappeared from the view of the camera.

A second advantage of embodiments of systems and methods in accordance with the invention is that the Fisheye image capturing device is calibrated to ensure that the resulting captured images comprise high resolution perspective images as compared to distorted wide/convex panoramic images.

A third advantage of embodiments of systems and methods in accordance with the invention is that the audio module acts as a smart triggering system, that controls the calibrated Fisheye image capturing device to capture high resolution perspective images of specific areas within the location of interest.

The above advantages are provided by embodiments of a system and method in accordance with the invention operating in the following manner.

According to a first aspect of the invention, an active audio-visual surveillance system for identifying events occurring at a location-of-interest is disclosed, the system comprising: a Fisheye image capturing device provided at the location-of-interest, the device configured to continuously capture wide-angle image frames and convert the captured wide-angle image frames into non-distorted perspective images using a set of calibration parameters generated by a fisheye correction scheme; an audio module provided at the location-of-interest, the module configured to capture audio signals and to determine a Direction of Arrival (DOA) of the audio signals; a computing module communicatively coupled to the audio module and the Fisheye image capturing device, the computing module being configured to: receive a notification from the audio module when the audio module detects an event having an audio signal at the location-of-interest, whereby the notification includes data of a DOA of the audio signal; instruct the Fisheye image capturing device to generate, using a trained single-image-super-resolution (SISR) scheme, high-resolution perspective images based on the non-distorted perspective images associated with the DOA of the audio signal.

In accordance with the first aspect of the invention, the fisheye correction scheme comprises a fisheye rectilinear transformation scheme.

In accordance with the first aspect of the invention, the audio module comprises: a plurality of sensor arrays configured to utilize a beamforming technique to estimate a direction of arrival of captured audio signals.

In accordance with the first aspect of the invention, the detecting the event having an audio signal at the location-of-interest by the audio module comprises: the audio module being configured to: generate a discrete set of DOA points that cover a DOA region from which the audio signal of the event was detected; and embed the discrete set of DOA points in the notification that is sent to the computing module.

In accordance with the first aspect of the invention, the generating the high-resolution perspective images based on the non-distorted perspective images by the Fisheye image capturing device comprises: the Fisheye image capturing device being configured to: extract the discrete set of DOA points received from the computing module, wherein the discrete set of DOA points are provided in the instructions sent by the computing module; generate a unified region of interest of the non-distorted perspective images that corresponds to the extracted set of DOA points; and generate, using the trained single-image-super-resolution (SISR) scheme, high-resolution perspective images of the unified region of interest.

In accordance with the first aspect of the invention, the generating the unified region of interest of the captured wide-angle image frames comprises: the Fisheye image capturing device being configured to: for every DOA point, extract a corresponding θ±36 degree region of interest from the non-distorted perspective images; and compile all the extracted θ±36 degree regions of interest to form the unified region of interest.

In accordance with the first aspect of the invention, the system further comprises another Fisheye image capturing device provided at the location-of-interest, the device configured to continuously capture wide-angle image frames and convert the captured wide-angle image frames into non-distorted perspective images using a set of calibration parameters generated by a fisheye correction scheme, another audio module provided at the location-of-interest, the module configured to capture audio signals and to determine a Direction of Arrival (DOA) of the audio signals; the computing module communicatively coupled to the another audio module and the another Fisheye image capturing device, the computing module being configured to: receive a notification from the another audio module when the another audio module detects the event having the audio signal at the location-of-interest, whereby the notification includes data of another DOA of the audio signal; instruct the another Fisheye image capturing device to generate, using the trained single-image-super-resolution (SISR) scheme, another high-resolution perspective images based on the captured wide-angle image frames associated with the another DOA of the audio signal; an event identification module configured to: receive the high-resolution perspective images, and the another high-resolution perspective images from the computing module; and stitch the received images to form a single set of high-resolution perspective images.

According to a second aspect of the invention, a method for identifying events occurring at a location-of-interest is disclosed, the method comprising: capturing continuously, using a Fisheye image capturing device provided at the location-of-interest, wide-angle image frames and converting the captured wide-angle image frames into non-distorted perspective images using a set of calibration parameters generated by a fisheye correction scheme; capturing, using an audio module provided at the location-of-interest, audio signals and determining a Direction of Arrival (DOA) of the audio signals; receiving, using a computing module communicatively coupled to the audio module and the Fisheye image capturing device, a notification from the audio module when the audio module detects an event having an audio signal at the location-of-interest, whereby the notification includes data of a DOA of the audio signal; instructing, using the computing module, the Fisheye image capturing device to generate, using a trained single-image-super-resolution (SISR) scheme, high-resolution perspective images based on the non-distorted perspective images associated with the DOA of the audio signal.

In accordance with the second aspect of the invention, the fisheye correction scheme comprises a fisheye rectilinear transformation scheme.

In accordance with the second aspect of the invention, the audio module comprises: a plurality of sensor arrays configured to utilize a beamforming technique to estimate a direction of arrival of captured audio signals.

In accordance with the second aspect of the invention, the step of detecting the event having an audio signal at the location-of-interest comprises: generating, using the audio module, a discrete set of DOA points that cover a DOA region from which the audio signal of the event was detected; and embedding, using the audio module, the discrete set of DOA points in the notification that is sent to the computing module.

In accordance with the second aspect of the invention, the step of generating the high-resolution perspective images based on the non-distorted perspective images by the Fisheye image capturing device comprises: extracting, using the Fisheye image capturing device, the discrete set of DOA points received from the computing module, wherein the discrete set of DOA points are provided in the instructions sent by the computing module; generating, using the Fisheye image capturing device, a unified region of interest of the non-distorted perspective images that corresponds to the extracted set of DOA points; and generating, using the Fisheye image capturing device and the trained single-image-super-resolution (SISR) scheme, high-resolution perspective images of the unified region of interest.

In accordance with the second aspect of the invention, the step of generating the unified region of interest of the captured wide-angle image frames comprises: for every DOA point, extracting, using the Fisheye image capturing device, a corresponding θ±36 degree region of interest from the non-distorted perspective images; and compiling all the extracted θ±36 degree regions of interest to form the unified region of interest.

In accordance with the second aspect of the invention, the method further comprises the steps of: capturing continuously, using another Fisheye image capturing device provided at the location-of-interest, wide-angle image frames and converting the captured wide-angle image frames into non-distorted perspective images using a set of calibration parameters generated by a fisheye correction scheme; capturing, using another audio module provided at the location-of-interest, audio signals and determining a Direction of Arrival (DOA) of the audio signals; receiving, using the computing module communicatively coupled to the another audio module and the another Fisheye image capturing device, a notification from the another audio module when the another audio module detects the event having the audio signal at the location-of-interest, whereby the notification includes data of another DOA of the audio signal; instructing, using the computing module, the another Fisheye image capturing device to generate, using the trained single-image-super-resolution (SISR) scheme, another high-resolution perspective images based on the captured wide-angle image frames associated with the another DOA of the audio signal; receiving, using an event identification module, the high-resolution perspective images, and the another high-resolution perspective images from the computing module; and stitching the received images to form a single set of high-resolution perspective images.

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to an active audio-visual system and method for identifying events occurring at a location-of-interest. In particular, the invention relates to a system that comprises a Fisheye image capturing device, an audio module and a computing module communicatively coupled to both the image capturing device and the audio module whereby all the modules and devices are provided at the location-of-interest. In operation, the audio module is configured to issue a notification to the computing module when an audio event is detected at the location-of-interest. The notification, which will contain data relating to the a Direction of Arrival (DOA) of the audio signal, will then be used by the computing module to cause the calibrated Fisheye image capturing device to generate high-resolution perspective images based on the non-distorted perspective images associated with the DOA of the audio signal.

The present invention will now be described in detail with reference to several embodiments thereof as illustrated in the accompanying drawings. In the following description, numerous specific features are set forth in order to provide a thorough understanding of the embodiments of the present invention. It will be apparent, however, to one skilled in the art, that embodiments may be realised without some or all of the specific features. Such embodiments should also fall within the scope of the current invention. Further, certain process steps and/or structures in the following may not been described in detail and the reader will be referred to a corresponding citation so as to not obscure the present invention unnecessarily.

Further, one skilled in the art will recognize that many functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processors. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Figure 1:
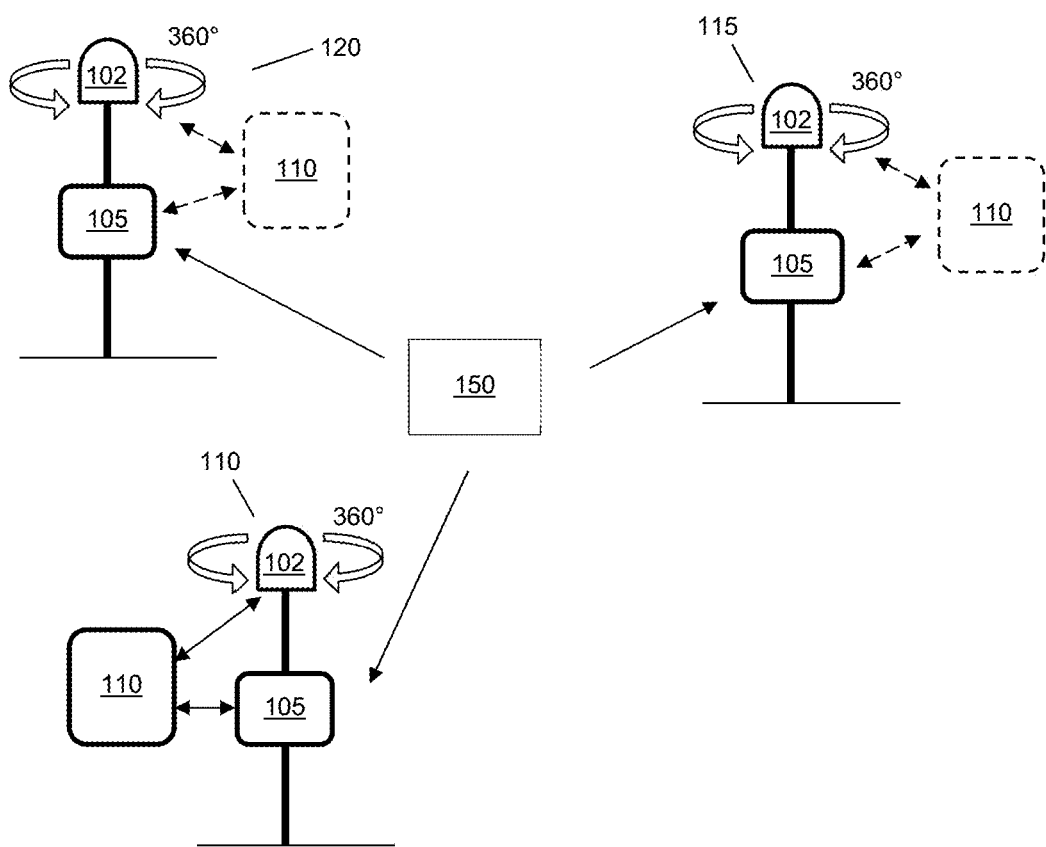
FIG. 1 illustrating a block diagram of an active audio-visual setup for identifying events occurring at a location of interest in accordance with embodiments of the invention.

FIG. 1 illustrates a block diagram of an active audio-visual setup for identifying audio-events occurring at a location of interest in accordance with embodiments of the invention. The setup illustrated in FIG. 1 comprises active audio-visual surveillance systems 110, 115 and 120. Each of these systems comprise calibrated Fisheye image capturing device 102, audio module 105 and computing module 110 that is communicatively connected to both Fisheye image capturing device 102 and audio module 105 of each of the systems. Computing module 110 may be communicatively connected to the respective modules and devices of systems 110, 115 and 120 via wired and/or wireless means (e.g. Wi-Fi, 3G/4G/5G cellular networks, Bluetooth, etc.).

In embodiments of the invention, Fisheye image capturing device 102 may comprise, but is not limited to, any type of image capturing device that is able to simultaneously capture a complete, surround view of an area. Such devices typically utilize multiple lenses/sensors or a fisheye lens to capture the entire view of the area in a single frame, without the need for the images from different camera views to be stitched together. Thus, through the use of such an image capturing device, blind spots may be avoided allowing a complete overview of the location of interest to be simultaneously captured. Depending on the use of the Fisheye image capturing device, device 102 may be installed vertically facing upwards (as illustrated in FIG. 1), may be installed horizontally facing a horizontal direction or may be installed vertically facing downwards. The manner in which device 102 is aligned is left as a design choice to one skilled in the art without departing from the invention. One skilled in the art will recognize that devices 102 may be communicatively linked together to automatically focus on a single target so that multiple views of the single target may be captured from multiple angles to obtain a complete view of the target.

In embodiments of the invention, Fisheye image capturing device 102 may comprise an ultra-wide-angle lens that is configured to capture a wide panoramic or hemispherical image. Such ultra-wide-angle lenses are able to achieve extremely wide angles of view. However, instead of producing images with straight perspective lines (rectilinear images), fisheye lenses typically make use a special mapping (for example: equisolid angles) to capture wide panoramic or hemispherical images and as a result, the captured images have a characteristic convex non-rectilinear appearance. This kind of distortion is known in the art as barrel distortion (whereby the image's magnification decreases from the optical line). Among the ultra-wide-angle lenses that may be used include, but is not limited to, a circular fisheye lens or a diagonal fisheye lens. Unfortunately, when a circular fisheye lens is used, it results in images that are greatly distorted whereby the amount of distortion is dependent on the proximity of the object to the lens and the location of the object in relation to the lens. As for the diagonal fisheye lens, it is able to roughly capture around 180° diagonal angle of view however, the captured image will generally have distorted images at the periphery of the image. The invention addresses these problems by using a fisheye correction scheme to generate a set of calibration parameters that are then subsequently used by the calibrated Fisheye image capturing device 102 to produce non-distorted perspective images. The detailed workings of the fisheye correction scheme will be discussed in greater detail in the later sections with reference to FIGS. 4 and 5.

In operation, each of audio modules 105 are configured to capture audio signals at the location of interest and to determine a point of origin or DOA of the captured audio signals. As illustrated in FIG. 1, it is assumed that audio-event 150 comprises an incident that occurred at the location of interest and that a sound or an audio signal associated with the incident and/or generated by the incident was captured by the respective audio modules 105. When the respective audio modules captured the audio signal, each of these modules will also determine the point of origin and/or the DOA of the audio signals. In embodiments of the invention, this may be done using a beamforming technique/algorithm.

Beamforming is a signal processing technique that is commonly used in sensor arrays for directional signal transmission or reception purposes. Beamforming is usually achieved by combining elements in a sensor array in such a way that signals received at particular angles experience constructive interference while signals received at other angles experience destructive interference.

In embodiments of the invention, such a sensor array may comprise, but is not limited to, a microphone array which includes Microelectromechanical systems (MEMs) microphones which have an omnidirectional pickup response that allow these MEMs microphones to respond equally to sounds coming from any direction. Such omnidirectional digital MEMs microphone arrays that are interfaced with a high-performance processor may then be configured to facilitate and run On-Chip advanced Digital Signal Processing (DSP) based beamforming audio algorithms. Multiple microphone arrays may then be configured in larger array configuration (an array can contain two or more microphones) to form a directional response or a beam pattern. Some microphone array devices known in the art comprise: ReSpeaker, MiniDSP, Matrix Creator, Conexant, and PlayStation Eye.

Computing module 110, that is communicatively connected to each of audio modules 105 and Fisheye image capturing device 102 is then configured to receive a notification from any one of audio modules 105 when audio module 105 detects audio-event 150 having an audio signal at the location-of-interest, whereby the notification includes data of a DOA of the audio signal. Computing module 110 then instructs each or least one of Fisheye image capturing devices 102 to generate, using a trained single-image-super-resolution (SISR) scheme, high-resolution perspective images based on the non-distorted perspective images associated with the DOA of the audio signal.

Figure 2:
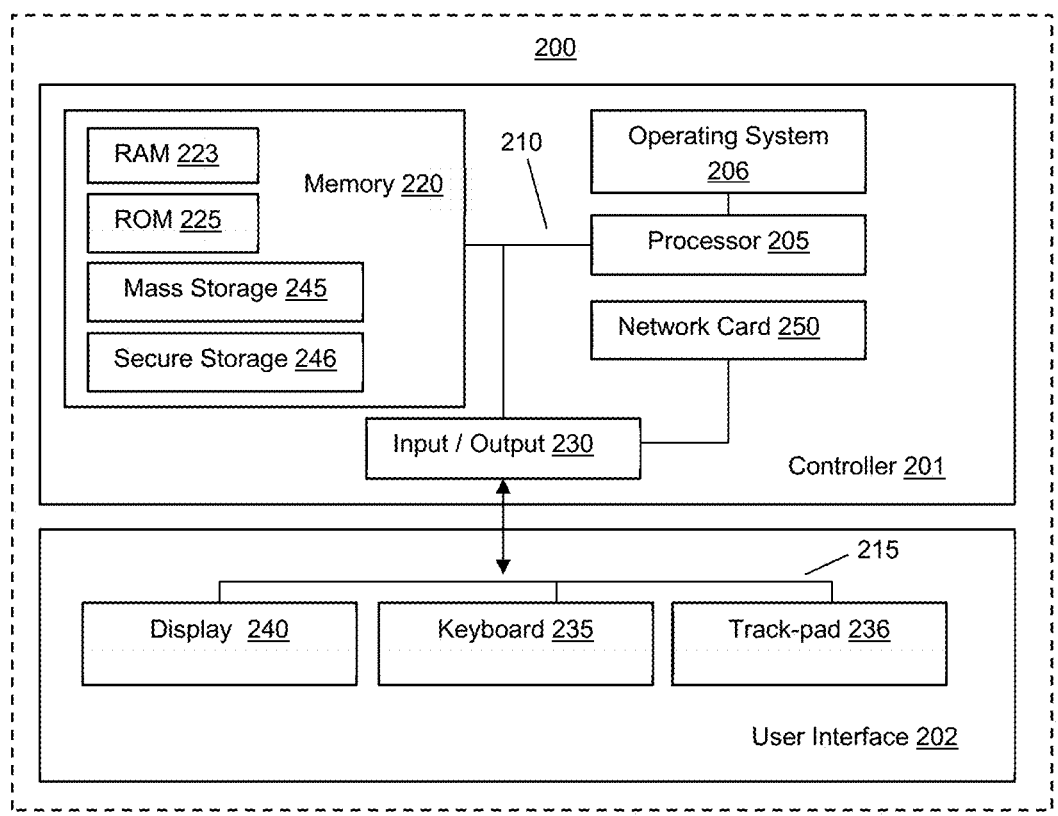
FIG. 2 illustrating a block diagram representative of processing systems providing embodiments in accordance with embodiments of the invention.

In accordance with embodiments of the invention, a block diagram representative of components of processing system 200 that may be provided within modules 105 and 110; and in modules provided within each of the image capturing devices for implementing embodiments in accordance with embodiments of the invention is illustrated in FIG. 2. One skilled in the art will recognize that the exact configuration of each processing system provided within these modules may be different and the exact configuration of processing system 200 may vary and FIG. 2 is provided by way of example only.

In embodiments of the invention, each of modules 105 and 110; and in modules provided within each of the image capturing devices may comprise controller 201 and user interface 202. User interface 202 is arranged to enable manual interactions between a user and each of these modules as required and for this purpose includes the input/output components required for the user to enter instructions to provide updates to each of these modules. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, processor 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from these modules via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). Memory 220 also includes secure storage 246 for securely storing secret keys, or private keys. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, processor 205 may be provided by any suitable logic circuitry for receiving inputs, processing them in accordance with instructions stored in memory and generating outputs (for example to the memory components or on display 240). In this embodiment, processor 205 may be a single core or multi-core processor with memory addressable space. In one example, processor 205 may be multi-core, comprising—for example—an 8 core CPU. In another example, it could be a cluster of CPU cores operating in parallel to accelerate computations.

Figure 3:
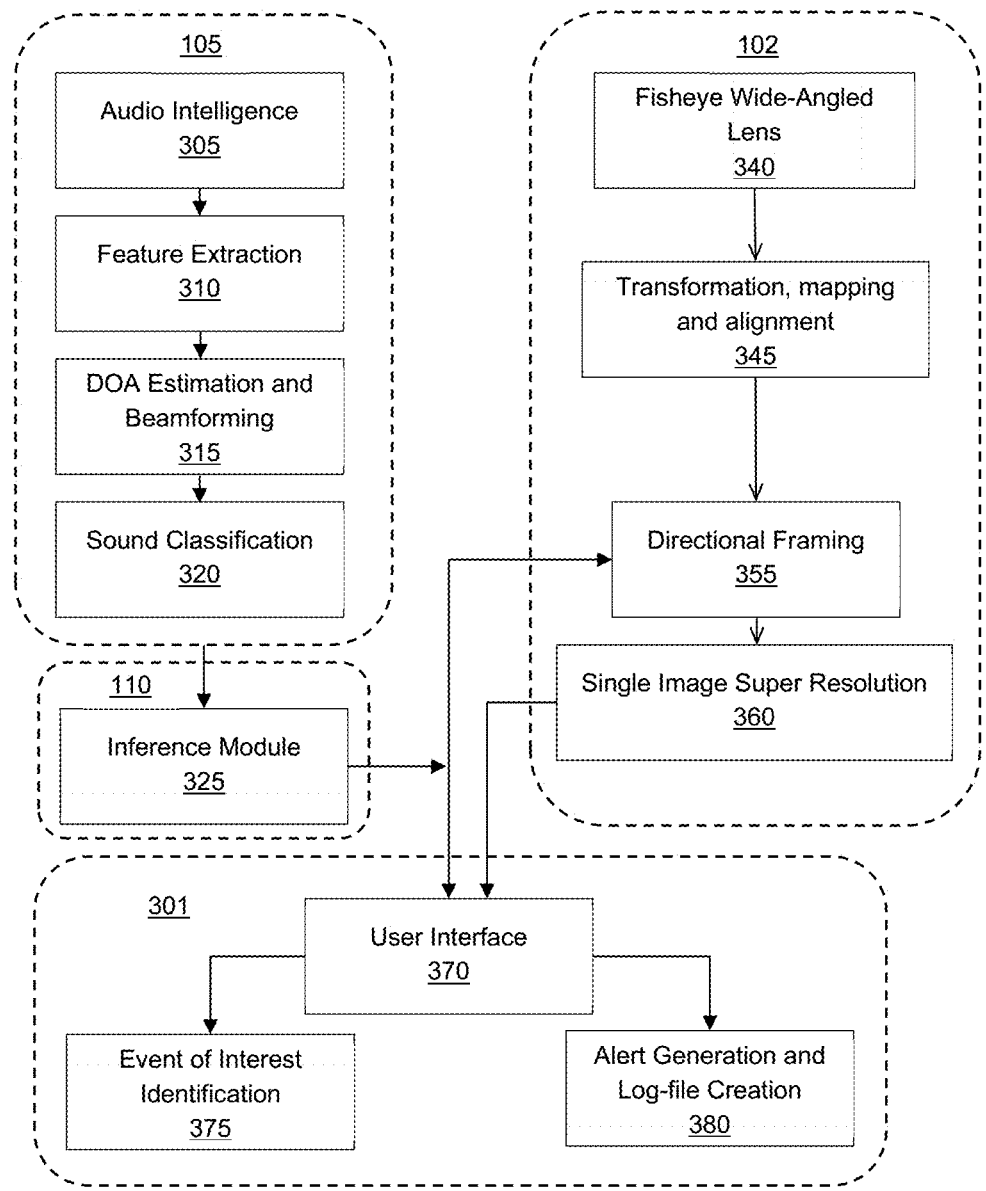
FIG. 3 illustrating modules and devices that make up one of the systems as illustrated in FIG. 1 for identifying events occurring at a location of interest in accordance with embodiments of the invention.

FIG. 3 illustrates the flow of data/information between modules and devices that make up one of the systems as illustrated in FIG. 1 for identifying events occurring at a location of interest in accordance with embodiments of the invention.

As shown in FIG. 3, each system comprises an audio module 105 and a Fisheye image capturing device 102 that are both communicatively linked to computing module 110. Audio module 105 comprises audio intelligence module 305, feature extraction module 310, DOA estimation and beamforming module 315 and sound classification module 320 while Fisheye image capturing device 102 comprises Fisheye wide-angled lens 340, transformation, mapping and alignment module 345, directional framing module 355 and single image super resolution module 360.

Audio intelligence module 305 is configured to monitor the location of interest for abnormal audio signals. In embodiments of the invention, when audio module 105 is first installed at a specific position at the location of interest, audio intelligence module 305 will capture a sample of the ambient noise at the location of interest over a period of time. For example, audio intelligence module 305 may be configured to capture the ambient noise at the location of interest over a period of seven days and may then be subsequently configured to generate a frequency spectrum representative of ambient noise present during this period. Subsequently, any captured audio signals that do not match this frequency spectrum may then be treated as abnormal audio signals. One skilled in the art will recognize that other methods may be employed by audio intelligence module 305 to identify abnormal audio signals without departing from this invention.

The detected abnormal audio signals will then be provided to feature extraction module 310. Module 310 may be configured to compare the detected abnormal audio signals with audio signals contained within a database to determine whether the audio signals are indeed to be classified as an abnormal signal or not. In embodiments of the invention, the database may be continuously updated by third party databases or by the administrator of the system based on the changes that may occur at the location of interest.

If the detected audio signal is classified by feature extraction module 310 as an abnormal audio signal, this abnormal audio signal is then provided to the direction-of-arrival (DOA) estimation and beamforming module 315. Module 315 is configured to utilize beamforming techniques and methods to determine a point of origin and/or DOA of the abnormal audio signal.

This information along with the abnormal audio signal is then provided to sound classification module 320. Module 320 then determines whether this abnormal audio signal originating from a particular point of origin at the location of interest should be investigated further. If module 320 determines that further investigations are warranted of the audio event, a notification will then be sent from audio module 105 to computing module 110. This notification will contain abnormal audio signal along with a point of origin of the audio signal within the location of interest.

Similarly, when Fisheye image capturing device 102 is first installed at a specific position at the location of interest, Fisheye wide-angled lens 340 will capture a complete wide-angled image of the location of interest. A rectilinear transformation scheme followed by a mapping and alignment scheme is then applied to the captured wide-angled image by module 345. Once this is done, module 345 would have generated a set of calibration parameters which may be used to subsequently convert wide-angled images frames into perspective images.

Wide-angled image frames that have been converted into perspective images are then provided to directional framing module 355. Module 355 is configured to select, based on instructions received from computing module 110, specific frames or images from the received perspective images. The selected image frames are then provided to single image super resolution module 360 which will convert the selected image frames into high resolution perspective images. These high resolution perspective images will then be provided to event identification module 301. One skilled in the art will recognize that event identification module 301 may be provided either at the location of interest or at a remote location and that wired and/or wireless communication means may be used to communicatively link module 301 to any of the modules in the active audio-visual surveillance system.

In accordance with embodiments of the invention, once computing module 110 has received the notification that contains the abnormal audio signal along with a point of origin and/or DOA of the audio signal within the location of interest from audio module 105, an inference module 325 is configured to generate suitable instructions to instruct directional framing module 355 within device 102 to select specific frames or images from perspective images contained within module 355 that cover the point of origin of the audio signal. In other words, the instructions provided by inference module 325 will cause directional framing module 355 to select images/frames that will show the source of the abnormal audio signal. The selected images/frames will then be provided to single image super resolution module 360 which will convert the selected images/frames into high resolution perspective images. These high resolution perspective images will then be provided to event identification module 301 for further processing.

Inference module 355 is also configured to provide the abnormal audio signal along with the point of origin of the audio signal within the location of interest to event identification module 301. Upon receiving the information from inference module 355 and the high resolution perspective images from device 102, event identification module 301 may cause this information to be displayed on user interface 370. A system administrator may then either trigger event of interest identification module 375, whereby the audio event will be further investigated or the administrator may trigger alert generation and log-file creation module 380 instead, whereby the audio event will be logged.

As mentioned in the previous section, Fisheye lenses tend to produce ultra-wide field of views by bending the incident lights however, the downside is that the resulting image tends to look severely distorted, particularly in the periphery. Therefore, a rectilinear transformation scheme is required to convert the wide-angled images into perspective images. Such a rectilinear transformation scheme is illustrated in FIG. 4.

Figure 4:
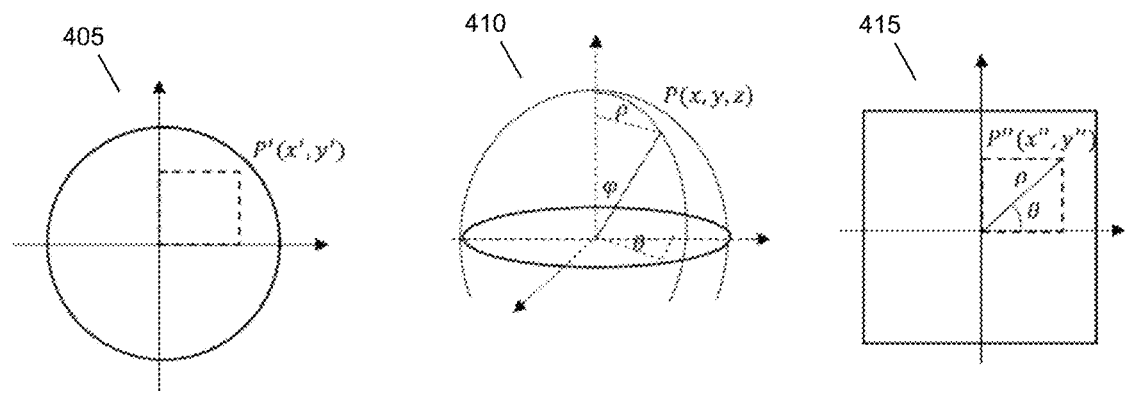
FIG. 4 illustrating a rectilinear transformation scheme in accordance with embodiments of the invention.

This method involves two steps as shown in FIG. 4. In the first step, each point P'(x',y') in the captured fisheye image 405 is projected to a 3-D point P(cos $\varphi_s$ sin $\theta_s$, cos $\varphi_s$ cos $\theta_s$, sin $\varphi_s$) in unit sphere 410. $\varphi_s$ and $\theta_s$ can be derived by considering the coordinates of the captured fisheye image directly as pitch and yaw. Therefore, $$\theta_s = f\frac{x'}{W} - 0.5, \text{ and } \varphi_s = f\frac{y'}{H} - 0.5,$$

where f is the lens' field of view (in degrees). W and H are the image's width and height respectively.

In the second step, in unit sphere 410, the distance between the projected centre and the 3-D point P(x,y,z) may be derived as:

$$\rho = \frac{H}{f}\tan^{-1}\frac{\sqrt{x^2+z^2}}{y}$$

$$x = \cos\varphi_s \sin\theta_s$$

$$y = \cos\varphi_s \cos\theta_s$$

$$z = \sin\varphi_s$$

The 2-D spherical (equirectangular) projected point P"(x",y") may then be constructed at 2D plot 415 as:

$$x''=0.5W+\rho\cos\theta$$

$$y''=0.5H+\rho\sin\theta$$

$$\theta=\tan^{-1}(z/x)$$

In this equirectangular projection, x" and y" are treated as the pitch and yaw respectively. The unwrapped image may then be viewed on a 360-degree player.

Figure 5:
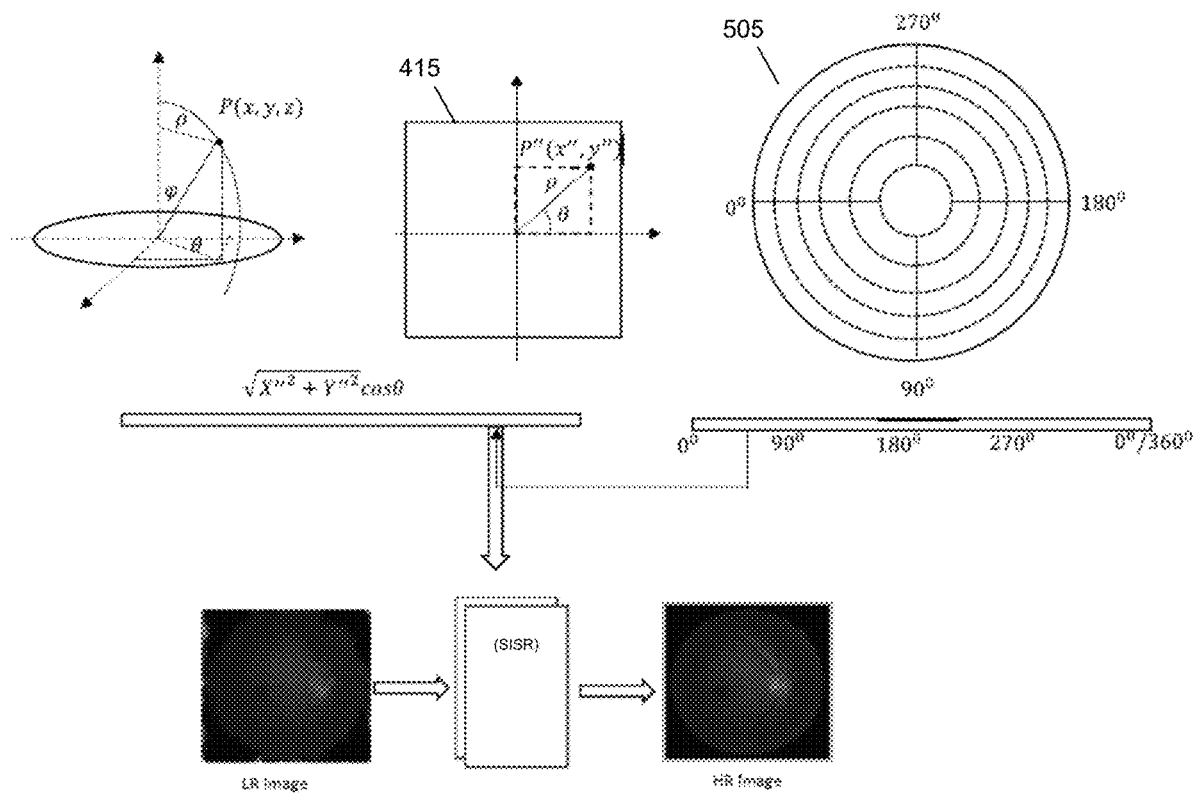
FIG. 5 illustrating a mapping and alignment scheme in accordance with embodiments of the invention.

Once the 2-D spherical (rectangular-linear) projected point P"(x",y") that was constructed from x"=0.5 W+ρ cos θ, y"=0.5H+ρ sin θ, and θ=tan⁻¹(z/x) has been obtained, a one to one calibration to the direction of arrival (DOA) of the microphone array, i.e. DOA 505 in FIG. 5, is carried out across the entire 360 degree region.

It is useful to note that the microphone array has a DOA resolution of 1 degree as such, each microphone array has 360 discrete DOA angles. Hence, once the 360 degree image has been unwrapped by the rectilinear transformation, each point from the unwrapped 360 degree image will be associated to a discrete DOA angle of the microphone array (which comprises 360 discrete points).

In embodiments of the invention, to capture the perspective view from a rectilinear transformation, a 72 degree Field of View (FOV) was extracted from the image frame. The Field of View (FOV) may be defined as the width or height of a scene to be monitored by the image capturing device. In general, a normal standard fixed lens and a wide angled fixed lenses would have a FOV around 60 to 80 degrees (72 degree, which is "360 degrees/5" microphones from the microphone array configuration).

In the process of extraction, for every value of θ that was obtained from the DOA 505 of the microphone array, a corresponding θ±36 degree region of interest was extracted from the projected point P"(x",y"). The extracted region of interest frame is then used for super resolution enhancement. The process above is illustrated in FIG. 5 where the region of interest frame as obtained from plot 415 is extracted based on the DOA 505 of the microphone array and subsequently enhanced using super-resolution enhancement.

Figure 6:
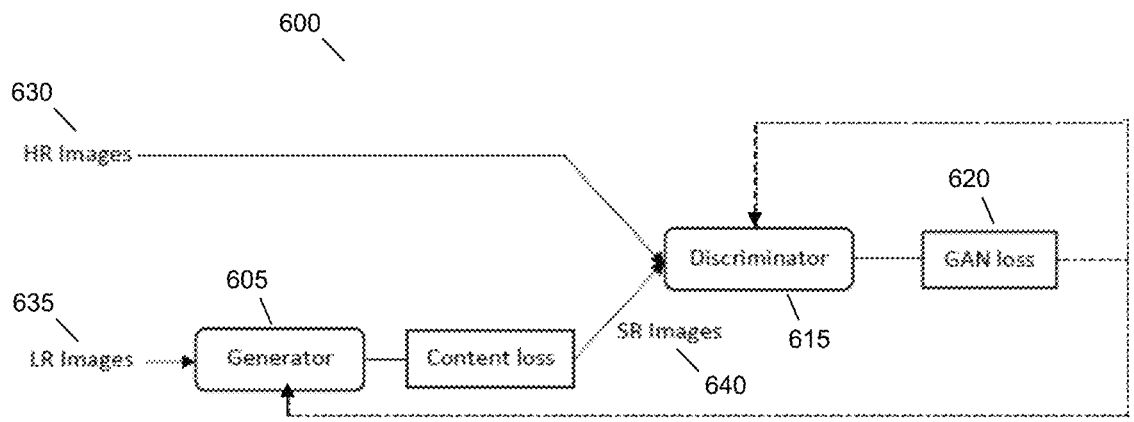
FIG. 6 illustrating a single image super resolution scheme in accordance with embodiments of the invention.

FIG. 6 illustrates a block diagram of a Super-Resolution Generative Adversarial Network (SR-GAN) that is combined with an adversary network to produce higher resolution images. In SR-GAN network 600, high resolution images 630 are down sampled (not shown) to produce low resolution images 635. GAN generator 605 then up samples the low resolution images to super-resolution images 640. During the up sampling, content loss may occur. Super-resolution images 640 and high resolution images 630 are then provided to discriminator 615. Discriminator 615 then distinguishes high resolution images 630 from the super-resolution images 640 and the resulting GAN loss 620 is then back propagated through network 600 to train discriminator 615 and generator 605. In embodiments of the invention, generator 605 and discriminator 615 may comprise convolution layers, batch normalization and parameterized ReLu. The detailed workings of SR-GAN network 600 are omitted for brevity as the detailed workings are known to one skilled in the art.

In embodiments of the invention, low resolution images 635 were obtained by down sampling the high resolution images by a factor of r (r=4 or 8) after applying a Gaussian filter for a blurred smoothing effect. In terms of width (W), height (H), and number of colour channels (C), image tensors for the low and high resolution images may comprise:

for low resolution $I^{LR}:(W*H*C)$ for high resolution $I^{HR}:(rW*rH*C)$

It is useful to note that in generative adversarial networks (GAN), two networks train and compete against each other, resulting in mutual improvisation. The generator misleads the discriminator by creating compelling fake inputs and tries to fool the discriminator into thinking of these as real inputs. The discriminator is then configured to determine if an input is real or fake. The output from the discriminator is then used by the generator to optimize data so that it is able to produce outputs that match true training data. In other words, it can be said that the discriminator is guiding the generator to produce realistic data through these training steps.

In embodiments of the invention, the generator may comprise appended identical residual blocks, each consisting of two Convolutional layers, followed by a batch normalization layer to reduce the effects of internal co-variate shifts. Residual blocks are used to better pass low-level information to the higher layers. A parametric ReLu may also be used as an activation function.

As for the discriminator, it may comprise eight convolutional layers and strided convolution layers may be used instead of max pooling layers. Strided convolution layers are preferred over pooling layers because they are a kind of convolution, and as such, the model is able to learn new parameters and increase its expressiveness. Conversely, max pooling just selects the maximum value for a given group of pixels as output. The resulting feature maps are followed by two fully connected layers and a final sigmoid activation function for classifying images.

During the training process, the Discriminator and Generator are both learning at the same time, and once the Generator is trained, it will be able to generate new super resolution (SR) images which share very similar properties with the original high resolution images. To achieve this single-image-super-resolution (SISR), it uses Perceptual loss function which comprise of Content and Adversarial loss.

In another embodiment of the invention, high-resolution perspective images of an event as generated by two Fisheye image capturing devices may be stitched together using known image processing techniques to form a more complete image of the event. In particular, in this embodiment of the invention, in addition to the generation of the high-resolution perspective images of the event by the first Fisheye image capturing device, a second Fisheye image capturing device may be provided at the location-of-interest whereby the device is configured to continuously capture wide-angle image frames and convert the captured wide-angle image frames into non-distorted perspective images using a set of calibration parameters generated by a fisheye correction scheme. A second audio module would also be provided at the location-of-interest, the module configured to capture audio signals and to determine a Direction of Arrival (DOA) of the audio signals caused by the event. The same computing module would then be communicatively coupled to the second audio module and the second Fisheye image capturing device. The computing module may then be configured to receive a notification from the second audio module when the second audio module detects the same event having the same audio signal at the location-of-interest, whereby the notification includes data of another DOA of the audio signal. The computing module upon receiving this notification then proceeds to instruct the second Fisheye image capturing device to generate, using the trained single-image-super-resolution (SISR) scheme, a second set of high-resolution perspective images based on the captured wide-angle image frames associated with the another DOA of the audio signal. An event identification module communicatively coupled to the computing module or provided within the computing module may then be configured to receive the original set of high-resolution perspective images, and the second set of high-resolution perspective images from the computing module. The event identification module may then stitch the received images to form a single complete set of high-resolution perspective images.

Figure 7:
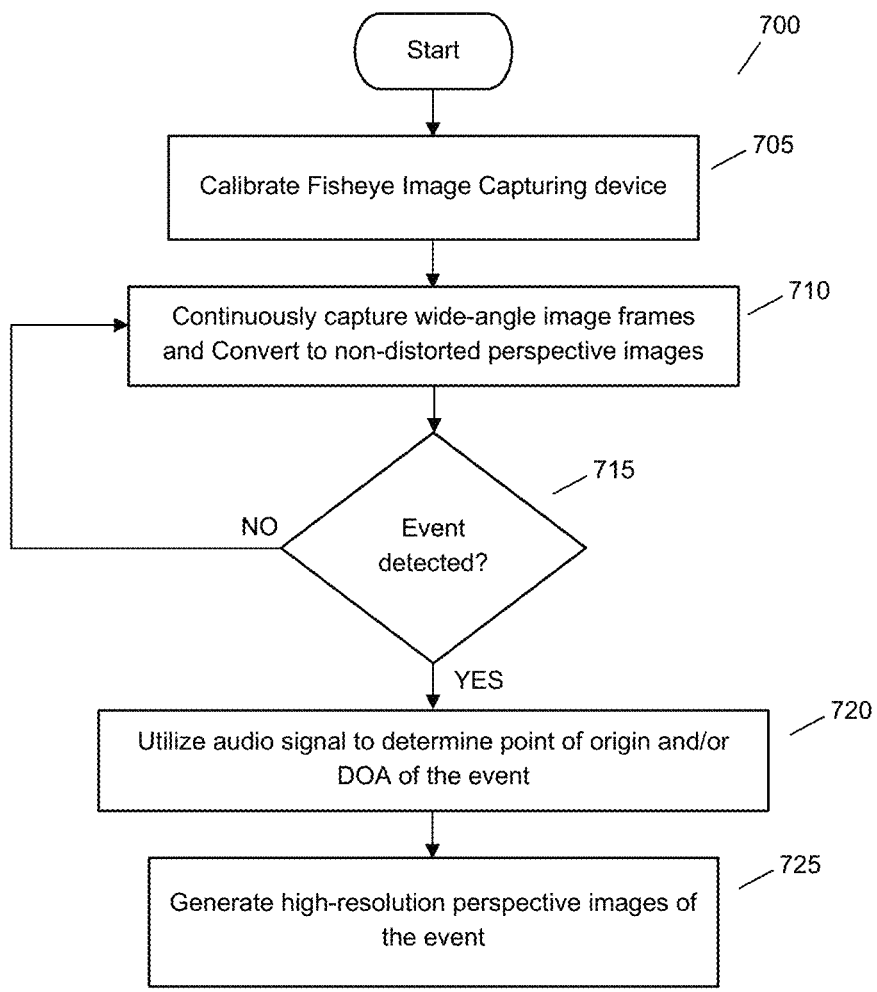
FIG. 7 illustrating a process for identifying events occurring at a location of interest in accordance with embodiments of the invention.

FIG. 7 sets out an exemplary flowchart of process 700 for identifying events occurring at a location-of-interest. Process 700 begins at step 705 with process 700 calibrating the Fisheye image capturing device based on the images at the location of interest where the device is installed. Once calibrated, process 700 causes the calibrated image capturing device to continuously capture wide-angled image frames and to convert the captured images to non-distorted perspective images. This takes place at step 710. If process 700 determines at step 715 that an event is detected at the location of interest, process 700 will proceed to step 720 else, process 700 will return to step 710 to continuously capture wide-angled images frames and convert them accordingly.

At step 720, process 700 will utilize a notification generated by the audio module to determine a point of origin and/or DOA of the event. In particular, contained within the notification would be the audio signal generated by the event and the point of origin and/or DOA of the audio signal. Process 700 then instructs the Fisheye image capturing device to generate, using a trained single-image-super-resolution (SISR) scheme, high-resolution perspective images of the event based on the non-distorted perspective images associated with the DOA of the audio signal.

Numerous other changes, substitutions, variations and modifications may be ascertained by the skilled in the art and it is intended that the present invention encompass all such changes, substitutions, variations and modifications as falling within the scope of the appended claims.

The invention claimed is:

1. An active audio-visual surveillance system for identifying events occurring at a location-of-interest, the system comprising:
a Fisheye image capturing device provided at the location-of-interest, the device configured to continuously capture wide-angle image frames and convert the captured wide-angle image frames into non-distorted perspective images using a set of calibration parameters generated by a fisheye correction scheme;
an audio module provided at the location-of-interest, the module configured to capture audio signals and to determine a Direction of Arrival (DOA) of the audio signals;
a computing module communicatively coupled to the audio module and the Fisheye image capturing device, the computing module being configured to:
receive a notification from the audio module when the audio module detects an event having an audio signal at the location-of-interest, whereby the notification includes data of a DOA of the audio signal;
instruct the Fisheye image capturing device to generate, using a trained single-image-super-resolution (SISR) scheme, high-resolution perspective images based on the non-distorted perspective images associated with the DOA of the audio signal; wherein the detecting the event having an audio signal at the location-of-interest by the audio module comprises the audio module being configured to:
generate a discrete set of DOA points that cover a DOA region from which the audio signal of the event was detected; and
embed the discrete set of DOA points in the notification that is sent to the computing module, and
wherein the generating the high-resolution perspective images based on the non-distorted perspective images by the Fisheye image capturing device comprises the Fisheye image capturing device being configured to:
extract the discrete set of DOA points received from the computing module, wherein the discrete set of DOA points are provided in the instructions sent by the computing module;
generate a unified region of interest of the non-distorted perspective images that corresponds to the extracted set of DOA points; and
generate, using the trained single-image-super-resolution (SISR) scheme, high-resolution perspective images of the unified region of interest.

2. The system according to claim 1 wherein the fisheye correction scheme comprises a fisheye rectilinear transformation scheme.

3. The system according to claim 1 wherein the audio module comprises:
a plurality of sensor arrays configured to utilize a beamforming technique to estimate a direction of arrival of captured audio signals.

4. The system according to claim 1 wherein the generating the unified region of interest of the captured wide-angle image frames comprises:
the Fisheye image capturing device being configured to:
for every DOA point, extract a corresponding θ±36 degree region of interest from the non-distorted perspective images; and
compile all the extracted θ±36 degree regions of interest to form the unified region of interest.

5. The system according to claim 1 further comprising:
another Fisheye image capturing device provided at the location-of-interest, the device configured to continuously capture wide-angle image frames and convert the captured wide-angle image frames into non-distorted perspective images using another set of calibration parameters generated by a fisheye correction scheme;

another audio module provided at the location-of-interest, the module configured to capture audio signals and to determine a Direction of Arrival (DOA) of the audio signals;

the computing module communicatively coupled to the another audio module and the another Fisheye image capturing device, the computing module being configured to:

receive a notification from the another audio module when the another audio module detects the event having the audio signal at the location-of-interest, whereby the notification includes data of another DOA of the audio signal;

instruct the another Fisheye image capturing device to generate, using the trained single-image-super-resolution (SISR) scheme, another high-resolution perspective images based on the captured wide-angle image frames associated with the another DOA of the audio signal;

an event identification module configured to:

receive the high-resolution perspective images, and the another high-resolution perspective images from the computing module; and stitch the received images to form a single set of high-resolution perspective images.

6. A method for identifying events occurring at a location-of-interest comprising:

capturing continuously, using a Fisheye image capturing device provided at the location-of-interest, wide-angle image frames and converting the captured wide-angle image frames into non-distorted perspective images using a set of calibration parameters generated by a fisheye correction scheme;

capturing, using an audio module provided at the location-of-interest, audio signals and determining a Direction of Arrival (DOA) of the audio signals;

receiving, using a computing module communicatively coupled to the audio module and the Fisheye image capturing device, a notification from the audio module when the audio module detects an event having an audio signal at the location-of-interest, whereby the notification includes data of a DOA of the audio signal;

instructing, using the computing module, the Fisheye image capturing device to generate, using a trained single-image-super-resolution (SISR) scheme, high-resolution perspective images based on the non-distorted perspective images associated with the DOA of the audio signal, wherein the step of detecting the event having an audio signal at the location-of-interest comprises:

generating, using the audio module, a discrete set of DOA points that cover a DOA region from which the audio signal of the event was detected; and embedding, using the audio module, the discrete set of DOA points in the notification that is sent to the computing module wherein the step of generating the high-resolution perspective images based on the non-distorted perspective images by the Fisheye image capturing device comprises:

extracting, using the Fisheye image capturing device, the discrete set of DOA points received from the computing module, wherein the discrete set of DOA points are provided in the instructions sent by the computing module;

generating, using the Fisheye image capturing device, a unified region of interest of the non-distorted perspective images that corresponds to the extracted set of DOA points; and generating, using the Fisheye image capturing device and the trained single-image-super-resolution (SISR) scheme, high-resolution perspective images of the unified region of interest.

7. The method according to claim 6 wherein the fisheye correction scheme comprises a fisheye rectilinear transformation scheme.

8. The method according to claim 6 wherein the audio module comprises:

a plurality of sensor arrays configured to utilize a beamforming technique to estimate a direction of arrival of captured audio signals.

9. The method according to claim 6 wherein the step of generating the unified region of interest of the captured wide-angle image frames comprises:

for every DOA point, extracting, using the Fisheye image capturing device, a corresponding $\theta \pm 36$ degree region of interest from the non-distorted perspective images; and compiling all the extracted $\theta \pm 36$ degree regions of interest to form the unified region of interest.

10. The method according to claim 6 further comprising the steps of:

capturing continuously, using another Fisheye image capturing device provided at the location-of-interest, wide-angle image frames and converting the captured wide-angle image frames into non-distorted perspective images using another set of calibration parameters generated by the fisheye correction scheme;

capturing, using another audio module provided at the location-of-interest, audio signals and determining a Direction of Arrival (DOA) of the audio signals;

receiving, using the computing module communicatively coupled to the another audio module and the another Fisheye image capturing device, a notification from the another audio module when the another audio module detects the event having the audio signal at the location-of-interest, whereby the notification includes data of another DOA of the audio signal;

instructing, using the computing module, the another Fisheye image capturing device to generate, using the trained single-image-super-resolution (SISR) scheme, another high-resolution perspective images based on the captured wide-angle image frames associated with the another DOA of the audio signal;

receiving, using an event identification module, the high-resolution perspective images, and the another high-resolution perspective images from the computing module; and stitching the received images to form a single set of high-resolution perspective images.

\* \* \* \* \*